United States Patent
Li

(10) Patent No.: US 11,620,482 B2
(45) Date of Patent: Apr. 4, 2023

(54) COLLABORATIVE ACTIVATION FOR DEEP LEARNING FIELD

(71) Applicant: Nokia Technologies Oy, Espoo (FI)

(72) Inventor: Hongyang Li, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 80 days.

(21) Appl. No.: 16/485,430

(22) PCT Filed: Feb. 23, 2017

(86) PCT No.: PCT/CN2017/074576
§ 371 (c)(1),
(2) Date: Aug. 12, 2019

(87) PCT Pub. No.: WO2018/152741
PCT Pub. Date: Aug. 30, 2018

(65) Prior Publication Data
US 2019/0385023 A1     Dec. 19, 2019

(51) Int. Cl.
*G06K 9/00* (2022.01)
*G06K 9/62* (2022.01)
(Continued)

(52) U.S. Cl.
CPC ......... *G06K 9/6276* (2013.01); *G06K 9/6256* (2013.01); *G06K 9/6262* (2013.01); *G06N 3/0481* (2013.01); *G06V 20/56* (2022.01)

(58) Field of Classification Search
CPC .. G06K 9/6276; G06K 9/6256; G06K 9/6262; G06K 9/00791; G06K 9/627;
(Continued)

(56) References Cited

U.S. PATENT DOCUMENTS 6,456,990 B1 * 9/2002 Hoffmann ............ G06N 3/0436
706/2
7,877,342 B2  1/2011 Buscema
(Continued)

FOREIGN PATENT DOCUMENTS

CN        104537393 A    4/2015
CN        105184309 A    12/2015
(Continued)

OTHER PUBLICATIONS

Xie, Lingxi, et al. "Geometric Neural Phrase Pooling: Modeling the Spatial Co-occurrence of Neurons." arXiv preprint arXiv: 1607.06514. (Year: 2016).*
(Continued)

*Primary Examiner* — Andrew M Moyer
(74) *Attorney, Agent, or Firm* — Mintz Levin Cohn Ferris Glovsky and Popeo, P.C.

(57) ABSTRACT

Methods and apparatus, including computer program products, are provided for machine learning including deep convolutional neural networks. In some example embodiments, there may be provided a method that includes receiving, at a trained machine learning model, a portion of a test image; activating, at the machine learning model, a convolutional result formed based on the portion of the test image, the activation based on neighboring regions in the test image; and providing, by the machine learning model, an activated output. Related systems, methods, and articles of manufacture are also described.

19 Claims, 6 Drawing Sheets

(51) Int. Cl.
  *G06N 3/04* (2023.01)
  *G06V 20/56* (2022.01)
(58) Field of Classification Search
  CPC ...... G06K 9/3233; G06K 9/4628; G06K 9/56; G06N 3/0481; G06N 3/0454; G06N 3/084; G06V 20/56; G06V 10/25; G06V 10/36; G06V 10/454; G06V 10/82
  USPC .................................................. 382/155–161
  See application file for complete search history.

(56) References Cited

U.S. PATENT DOCUMENTS

| | | | |
|---|---|---|---|
| 9,346,167 | B2 | 5/2016 | O'Connor et al. |
| 2015/0347831 | A1 | 12/2015 | Tamatsu et al. |
| 2016/0140424 | A1 | 5/2016 | Wang et al. |
| 2016/0358321 | A1 | 12/2016 | Xu et al. |
| 2017/0032285 | A1 | 2/2017 | Sharma et al. |
| 2018/0150740 | A1* | 5/2018 | Wang ............... G06T 7/248 |

FOREIGN PATENT DOCUMENTS

| | | |
|---|---|---|
| CN | 106250915 A | 12/2016 |
| WO | 2016/150472 A1 | 9/2016 |

OTHER PUBLICATIONS

Xie et al., "Geometric Neural Phrase Pooling: Modeling the Spatial Co-occurrence of Neurons", arXiv, Jul. 21, 2016, pp. 1-18.
Cai et al., "Deep Neural Networks with Multistate Activation Functions", Computational Intelligence and Neuroscience, 2015, pp. 1-10.
Li et al., "Multi-Bias Non-linear Activation in Deep Neural Networks", arXiv, Apr. 3, 2016, 9 pages.
Papadopoulos et al., "Deep Cross-Layer Activation Features For Visual Recognition", IEEE International Conference on Image Processing (ICIP), 2016, 5 pages.
Nair et al., "Rectified Linear Units Improve Restricted Boltzmann Machines", Proceedings of the 27th International Conference on International Conference on Machine Learning (ICML), 2010, 8 pages.
Glorot et al., "Deep Sparse Rectifier Neural Networks", Proceedings of the Fourteenth International Conference on Artificial Intelligence and Statistics (AISTATS), 2011, pp. 315-323.
He et al., "Delving Deep into Rectifiers: Surpassing Human-Level Performance on ImageNet Classification", arXiv, 2015, pp. 1-11.
Xu et al., "Empirical Evaluation of Rectified Activations in Convolutional Network", ICML Deep Learning Workshop, 2015, 5 pages.
Goodfellow et al., "Maxout Networks", Proceedings of the 30 th International Conference on Machine Learning (ICML), 2013, 9 pages.
Clevert et al., "Fast and Accurate Deep Network Learning by Exponential Linear Units (ELUs)", International Conference on Learning Representations (ICLR), Feb. 22, 2016, pp. 1-14.
Shang et al., "Understanding and Improving Convolutional Neural Networks via Concatenated Rectified Linear Units", Proceedings of the 33rd International Conference on MachineLearning (ICML), Jul. 19, 2016, 17 pages.
Maas et al., "Rectifier Nonlinearities Improve Neural Network Acoustic Models", Proceedings of the 30th International Conference on Machine Learning (ICML), 2013, 6 pages.
Li et al., "Improving Deep Neural Network with Multiple Parametric Exponential Linear Units", arXiv, 2016, pp. 1-17.
Fasih et al., "Video Enhancement for ADAS Systemsbased on FPGA and CNN Platform", International Journal of Signal & Image Processing, Jan. 2010, pp. 1-8.
International Search Report and Written Opinion received for corresponding Patent Cooperation Treaty Application No. PCT/CN2017/074576, dated Nov. 24, 2017, 11 pages.
Blot et al., "Max-min Convolutional Neural Networks for Image Classification", IEEE International Conference on Image Processing (ICIP), 2016, pp. 3678-3682.
Chinese Search Report for corresponding Chinese Application No. 201780087233.1, dated Oct. 26, 2021, 2 pages.

* cited by examiner

COLLABORATIVE ACTIVATION FOR DEEP LEARNING FIELD

RELATED APPLICATION

This application was originally filed as PCT Application No. PCT/CN2017/074576 filed Feb. 23, 2017.

The subject matter described herein relates to machine learning.

BACKGROUND

Machine learning refers to systems that allow processors such as a computer the ability to learn. Machine learning includes technologies such as pattern recognition, neural networks, and/or other technologies. For example, a neural network can be trained to detect words in speech, detect license plates, and perform other tasks. In machine learning, the learning can be supervised or unsupervised. In supervised learning, the machine learning model is provided a training set that includes reference information, such as labels. For example, in supervised learning, the training set of images may include labels to identify the license plate and the characters of the license plate. In unsupervised learning, the machine learning model learns the data structure or patterns in the data on its own.

SUMMARY

Methods and apparatus, including computer program products, are provided machine learning.

In some example embodiments, there may be provided a method that includes receiving, at a machine learning model, a portion of a training image; and activating, at the machine learning model, a convolutional result formed based on the portion of the training image, the activation based on at least one neighboring region in the training image.

In some variations, one or more of the features disclosed herein including the following features can optionally be included in any feasible combination. The machine learning model may include a neural network. The machine learning model may include a convolutional neural network and/or a deep convolutional neural network. The activation may be a non-linear function and based on a combination of the convolutional result and another convolutional result of the at least one neighboring region. The combination may represent a normalized difference squared between the convolutional result and the another convolutional result. The convolution result may represent an inner product between the portion of the test image and a weight vector, and wherein the other convolutional represents an inner product between another portion of the test image and another weight vector. The machine learning model may provide an activated output. The machine learning model may be trained using back propagation.

In some example embodiments, there may be provided a method that includes receiving, at a trained machine learning model, a portion of a test image; activating, at the machine learning model, a convolutional result formed based on the portion of the test image, the activation based on neighboring regions in the test image; and providing, by the machine learning model, an activated output.

In some variations, one or more of the features disclosed herein including the following features can optionally be included in any feasible combination. The machine learning model may include a neural network. The machine learning model may include a convolutional neural network and/or a deep convolutional neural network. The activation may be a non-linear function and based on a combination of the convolutional result and another convolutional result of the at least one neighboring region. The combination may represent a normalized difference squared between the convolutional result and the another convolutional result. The convolution result may represent an inner product between the portion of the test image and a weight vector, and wherein the other convolutional represents an inner product between another portion of the test image and another weight vector. An activated output may be provided to another layer in a convolutional layer. The activated output may be provided to a pooling layer.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1A:
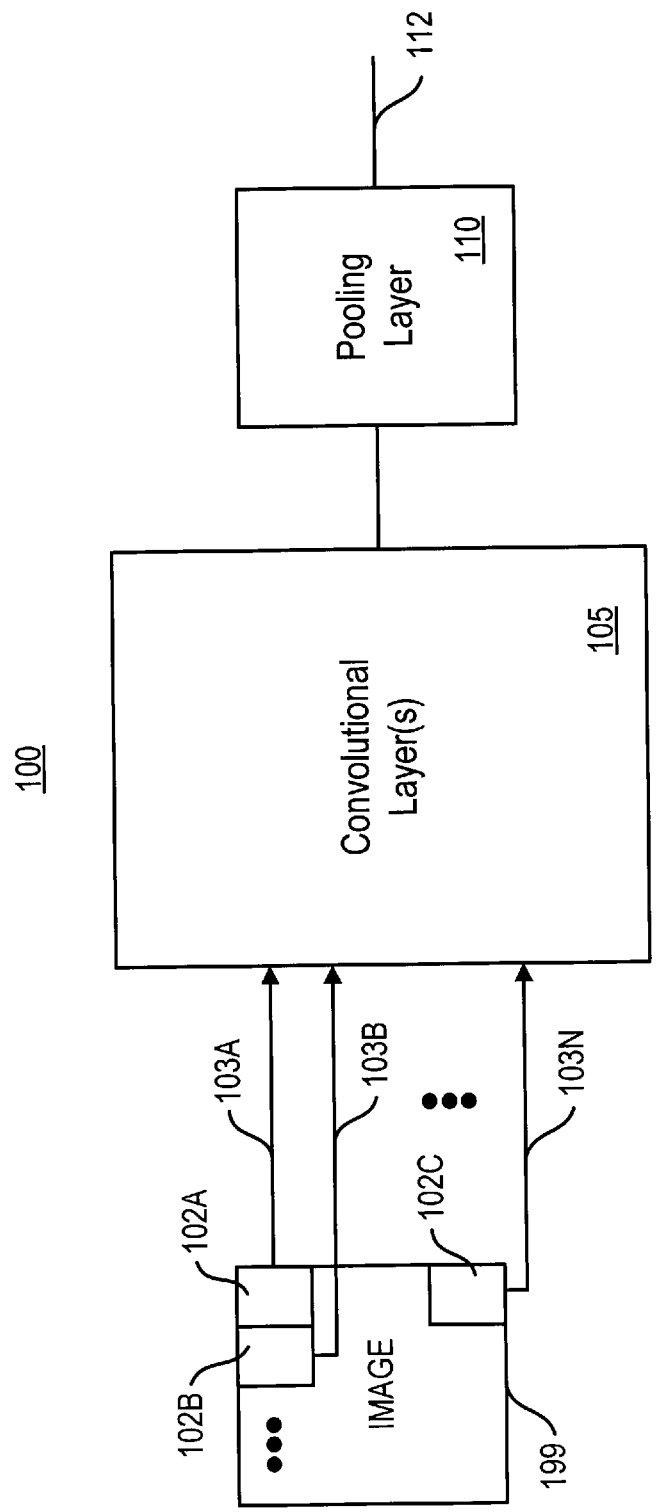
FIG. 1A depicts an example of a system including a machine learning model including neighbor-based activation, in accordance with some example embodiments.

Like labels are used to refer to same or similar items in the drawings.

DETAILED DESCRIPTION

Image recognition including detection and classification may be used in image processing and machine vision. For example, systems including advanced driver assistance systems (ADAS), self-driving cars, video surveillance, intelligent robotics, virtual reality, and/or the like may include image recognition technology. Neural network circuitry may, for example, be configured to provide deep learning to enable enhanced image detection and/or classification. For example, the recognition accuracy of deep learning can be better than, or comparable to, a human when performing some image recognition tasks.

In deep learning, an input vector may be transformed into a scalar by computing the inner product (also referred to as a dot product) of the input vector and a weight vector (also referred to as a filter, a kernel, a convolutional filter, or a convolutional kernel). In other words, the scalar output is a result of the convolution of the convolutional filter and the input vector. This scalar output may also be referred to as a convolutional result. An activation function may then be applied to the scalar/convolutional result.

Although some of the examples refer to a deep learning convolutional neural network (CNN), the activation scheme disclosed herein may be used with other types of artificial intelligence techniques, machine learning models, neural networks, and other types of CNNs.

FIG. 1A depicts an example of a CNN based system 100, in accordance with some example embodiments. The CNN may include at least one convolutional layer 105. The input to the convolutional layer 105 may be an input vector 103A, which in the example of FIG. 1A represents at least a portion 102A of image 199. For example, each pixel in the image patch 102A may be used to form a vector, such as vector x which may include $x_0$ through $x_N$ elements (which may corresponds to the pixels at 102A). The other patches 102B, 102N may also form corresponding vectors and elements as well.

At the convolutional layer(s) 105, an input vector may be transformed into a scalar output by at least computing the dot product of the input vector and a set of weights. Next, an activation function is applied to the scalar output. In the case of a CNN, at least one pooling layer 110 may be used to down sample activated outputs. Although the example of FIG. 1A depicts non-overlapping portions or patches at 102A, 102B, and so forth, the patches/portions may overlap as well. Moreover, the portion may comprise the whole image 199 as well.

Figure 1B:
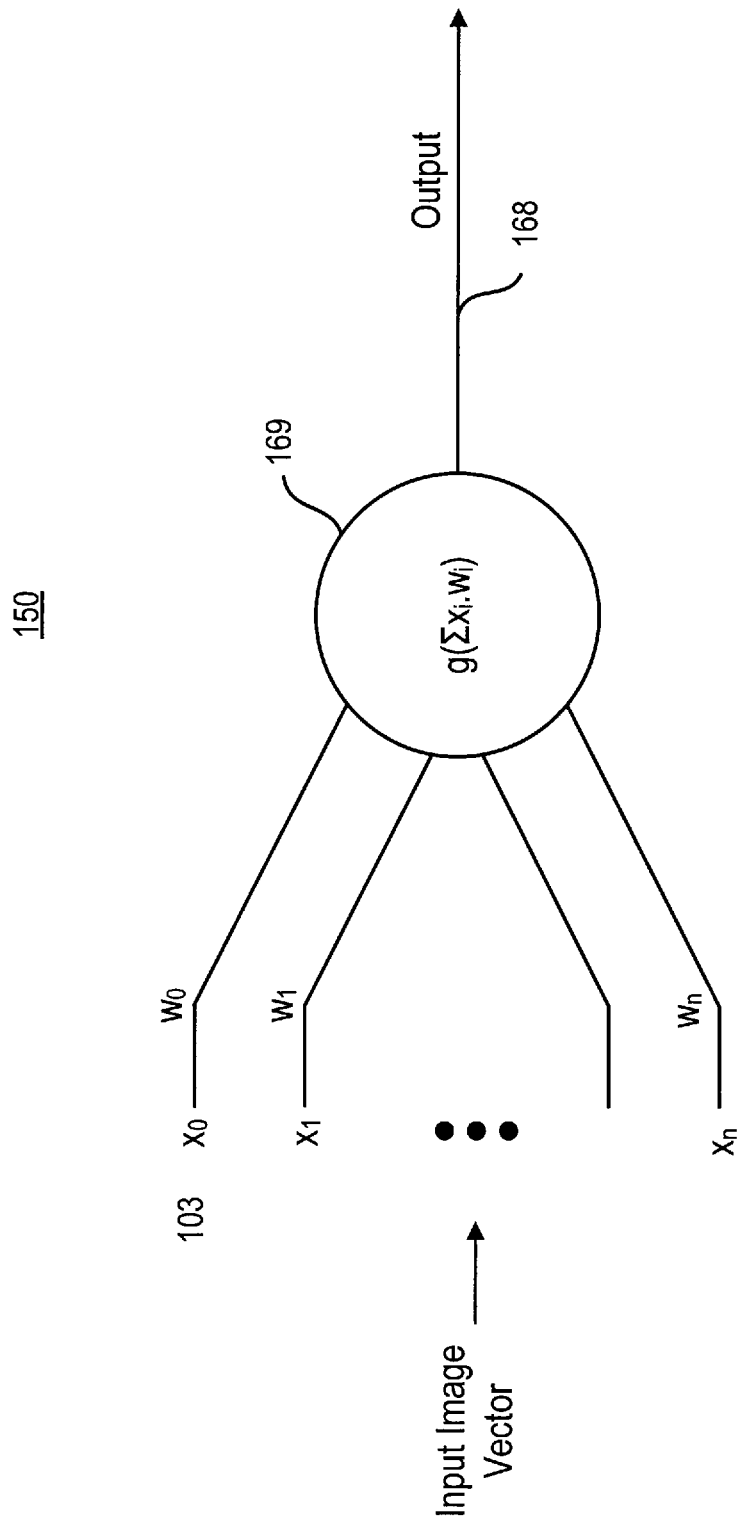
FIG. 1B depicts an example of a model of a node including neighbor-based activation, in accordance with some example embodiments.

FIG. 1B depicts an example of a single node 150 of a neural network, in accordance with some example embodiments. For example, the at least one convolutional layer 105 may include at least one node such as node 150, although there may be a plurality nodes 150 in the at least one convolutional layer 150 as well.

The node 150 may receive an input such as an input vector 103A representing a portion 102A of image 199. For the input vector, the inner product of the input vector $x_0$-$x_n$ and the weight vector $w_0$-$w_n$ generates a scalar (see, e.g., 169 where the scalar is the sum of the $x_i*w_i$ as i goes from 0 to n). Next, an activation function, g, may be applied at 169 as well to form an activation output, such as a node output 168. The activation function, g, may be a function, such as a non-linear function examples of which include a sigmoid, a ReLu function, and/or other types of functions. Moreover, the node 150 (or other nodes 150) may process patches 102B though 102N in a similar way.

The sigmoid noted above may have the following form:

$$\text{sigmoid}(x) = \frac{1}{1+e^{-x}}, \quad (1).$$

And, the ReLu function noted above may have the following form:

$$\text{Re } LU(x) = \begin{cases} x, & \text{if } x \geq 0 \\ 0, & \text{if } x < 0 \end{cases}. \quad (2)$$

To illustrate by way of the example at FIG. 1A, the CNN 105 may be trained to detect and/or classify an object in the image 199 or a portion/patch of that image. Once trained, the output 112 may provide an indication of whether the object (or the type of object) is present in the image or whether the image is just a so-called "background" image without an object of interest. For example, the input vectors 103A-N may sample different portions of the image 199, and when an object is detected, the output 112 may indicate that the object is present.

Some neural networks may independently apply an activation function, g, to the convolutional result, without considering the relationship between neighboring convolutional results. In other words, the activation function, g, can be statically applied to the input vector 103A for example without considering neighboring convolutional results for neighboring regions or portions of the image. Referring to Equations 1 and 2 above, if a scalar element x is to be activated by the activation function, information regarding the neighbors, are not (prior to the subject matter disclosed herein) taken into account.

In some example embodiments, neighbor-based activation for machine learning may be provided. In some example embodiments, a collaborative activation of spatially neighboring convolutional results may be provided. In some example embodiments, the relationship of neighboring convolutional results, such as the convolutional result of a local or adjacent region (e.g., an adjacent patch or portion) may be utilized in the activation function (which may generate an activation function result that better represents the input). As used herein, a neighbor-based activation refers to an activation function of a neural network, wherein the activation function may take into account at least one neighboring convolution result.

Referring to FIG. 1A, suppose a convolutional result $x_c$ for the input vector $x_i$ (e.g., vector 103A for portion/patch 102A) and suppose the local region $\Omega(x_c)$ comprises the neighboring elements (e.g., vector 103B for portion/patch 102B or some other neighboring portion of image 199) of vector $x_i$. Moreover, suppose g is the activation function, such as a sigmoid function, a ReLU function, and/or another type of activation function.

In some example embodiments, the neighbor-based activation function, g, is a function of both the convolution result $x_c$ for input vector $x_i$ 103A and the convolutional result for the neighboring region $\Omega(x_c)$, which may take the form of $f(x_{co}, \Omega(x_c))$. Thus, the activation function output/result may thus also depend on neighbors.

In some example embodiments, the neighbor-based activation function, g, takes into account the current convolutional result such as $x_c$ and the convolutional result(s) of at least neighboring, local region $\Omega(x_c)$. In some example embodiments, the activation function is of the following form:

$$f(x_c, \Omega(x_c)) = g\left(x_c + \frac{\alpha \sum_{x \in \Omega(x_c)} (x_c - x)^2}{N(\Omega(x_c))}\right), \quad (3),$$

wherein:

x is an element of the neighboring convolutional result $\Omega(x_c)$, $N(\Omega(x_c))$ is the number of elements of $\Omega(x_c)$ (e.g., the quantity of neighbors of $x_c$), and $\alpha$ is a parameter which can be preconfigured or learned when training the CNN.

The term $$\alpha \sum_{x \in \Omega(x_c)} (x_c - x)^2$$

may provide an indication or measure regarding the variation in the neighbors. When Equation (3) provides a relatively larger activation result, this may indicate a larger importance of $x_c$ and its neighbors $\Omega(x_c)$.

In some example embodiments, the neighbor-based activation function takes into account neighbors as noted, and the activation function may be used to detect and/or classify images including videos. Moreover, the detection and/or classification may be used in an advanced driver assistance system, autonomous vehicle system, and/or other systems including machine vision to classify and/or detect images. To that end, a CNN may be configured so that at least one node (if not all nodes) of the CNN may include an activation function, such as f $(x_c, \Omega(x_c))$ noted above with respect to Equation 3, that takes into account neighbors. Next, the CNN may be trained (e.g., using a back-propagation algorithm and/or other training scheme) to perform detection and/or classification. The trained CNN may then be used to detect and/or classify images (or objects in the image).

Figure 2:
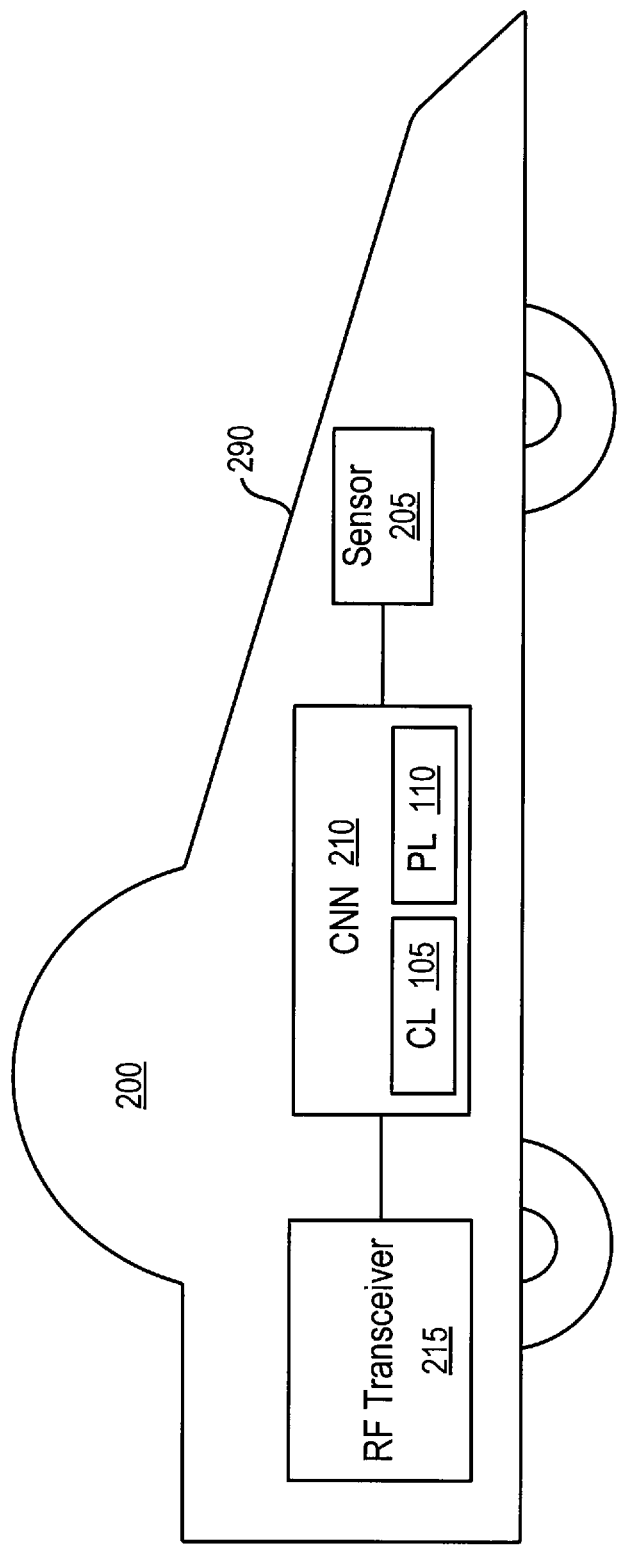
FIG. 2 depicts an example of a system including a machine learning model including neighbor-based activation, in accordance with some example embodiments.

FIG. 2 depicts an example system 200 including a sensor 205 and a CNN 210, in accordance with some example embodiments. The system 200 may also include a radio frequency transceiver 215. Moreover, the system 200 may be mounted in a vehicle 290, such as a car or truck, although the system may be used without the vehicles 290 as well.

The sensor 205 may comprise at least one image sensor configured to provide image data, such as image frames, video, pictures, and/or the like. In the case of advanced driver assistance systems/autonomous vehicles for example, the sensor 205 may comprise a camera, a Lidar (light detection and ranging) sensor, a millimeter wave radar, an infrared camera, and/or other types of sensors.

In some example embodiments, the system 200 may be trained to detect objects, such as people, animals, other vehicles, traffic signs, road hazards, and/or the like. In the advanced driver assistance system (ADAS), when an object is detected, such as a vehicle/person, an output such as a warning sound, haptic feedback, indication of recognized object, or other indication may be generated to for example warn or notify a driver. In the case of an autonomous vehicle including system 200, the detected objects may signal control circuitry to take additional action in the vehicle (e.g., initiate breaking, acceleration/deceleration, steering and/or some other action). Moreover, the indication may be transmitted to other vehicles, IoT devices or cloud, mobile edge computing (MEC) platform and/or the like via radio transceiver 215.

The system 200 may also include at least one CNN circuitry 210, in accordance with some example embodiments. The CNN circuitry 210 may represent dedicated CNN circuitry configured with a neighbor-based activation function, g, taking into account neighbors as described for example with respect to Equation 3. The dedicated CNN circuitry may provide a deep CNN. Alternatively or additionally, the CNN circuitry may be implemented in other ways such as, using at least one memory including program code which when executed by at least one processor provides the CNN 210.

In some example embodiments, the system 200 may have a training phase. The training phase may configure the CNN 210 to learn to detect and/or classify one or more objects of interest. Referring to the previous example, the CNN circuitry 210 may be trained with images including objects such as people, other vehicles, road hazards, and/or the like. Once trained, when an image includes the object(s), the trained CNN 210 may detect the object(s) and provide an indication of the detection/classification of the object(s). In the training phase, the CNN 210 may learn its configuration (e.g., parameters, weights, and/or the like). Once trained, the configured CNN can be used in a test or operational phase to detect and/or classify patches or portions of an unknown, input image and thus determine whether that input image includes an object of interest or just background (i.e., not having an object of interest).

Figure 3:
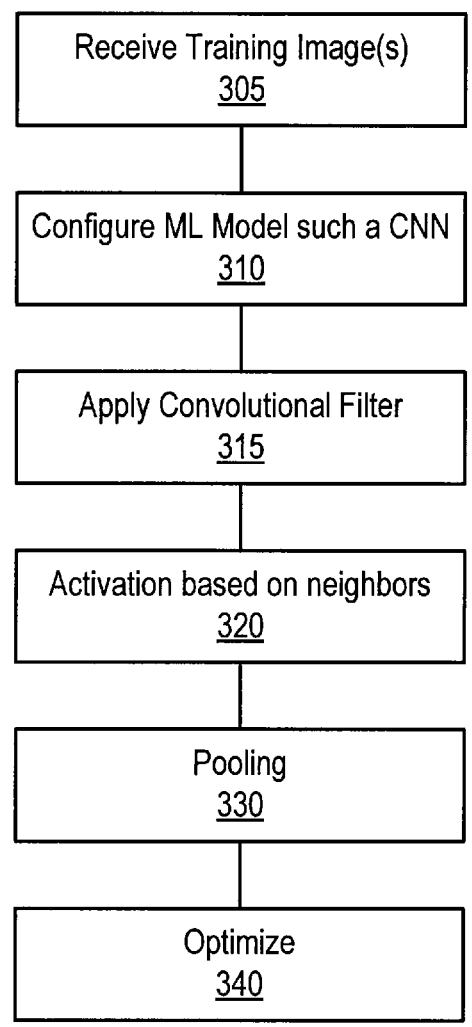
FIG. 3 depicts an example of a process for training a machine learning model including neighbor-based activation, in accordance with some example embodiments.

FIG. 3 depicts an example of a process 300 for training a CNN configured to take into account neighbors, in accordance with some example embodiments.

At 305, a set of training images may be prepared, in accordance with some example embodiments. For example, a set of training (or reference) images may be processed and labeled. The labels may be used during training to indicate whether a given image is for example a background image or whether the image contains an object of interest (e.g., an object that the CNN needs to detect/classify).

At 310, the CNN may be configured, in accordance with some example embodiments. The CNN 100 may be configured to have a certain number of convolutional layer, s and a quantity of feature maps (which is an output of a CNN layer, x·w, before application of the neighbor-based activation function) in a layer i may be $N_i$, and the quantity of feature maps in layer i−1 may be $N_{i-1}$.

At 315, a convolution filter may be applied to the training images, in accordance with some example embodiments. The convolutional filter $w_i$ (e.g., $w_1, w_2, \ldots w_n$) of size ($w_i$ times $h_i \times N_i$) may be configured in order to obtain the convolutional result of layer i. The convolutional result may, as noted, be obtained by convolving the input of the layer i with the filters $w_1, w_2, \ldots, w_n$. The configuration may include the convolution stride (or step size), the filter sizes, and the number of filters.

At 320, the neighbor-based activation, g, may be applied to each input image vector corresponding to a portion of patch of the test image, in accordance with some example embodiments. For example, suppose $x_c$ is a convolutional result at location c of the convolutional layer i. Given $\Omega(x_c)$ is a local region and the elements of $\Omega(x_c)$ are the neighbors of $x_c$, and given activation function, g, such as the activation function depicted at Equation 3, the activation result may be defined as f $(x_{cc}, \Omega(x_c))$, which depends on not only $x_c$ but also its neighbors $\Omega(x_c)$. The term $$\alpha \sum_{x \in \Omega(x_c)} (x_c - x)^2$$

may provide as noted a measure of the variation in the neighbors.

At 330, the pooling layer may provide down sampling, in accordance with some example embodiments. For example, the activation outputs may be down sampled using max-pooling at pooling layer 110.

At 340, an optimization may be performed to train the CNN, in accordance with some example embodiments. The parameters of the convolutional filters and the parameters of the activation function, g, may be obtained by minimizing the mean squared error of the training set. A back-propagation algorithm may be used for solving the minimization problem. In back-propagation, the gradients of the mean squared error with respect to the parameters of the filters and parameters of the activation function, g, may be computed and back-propagated. The back-propagation may be conducted in several epochs until convergence, which indicates the CNN may be trained.

Figure 4:
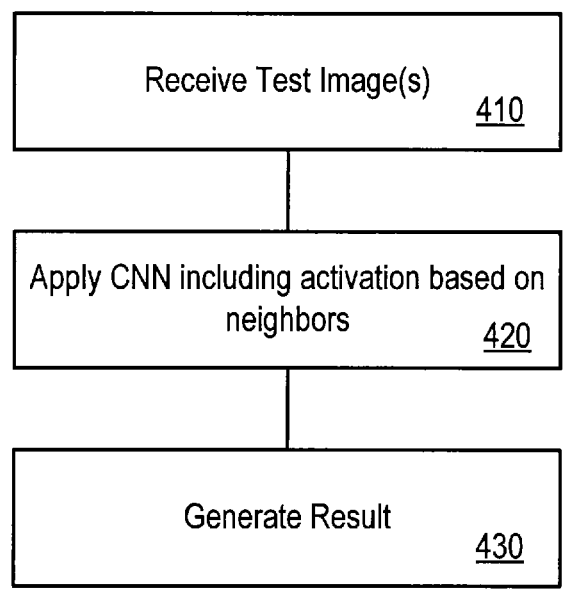
FIG. 4 depicts an example of a process for detecting using a machine learning model including neighbor-based activation, in accordance with some example embodiments.

FIG. 4 depicts an example of a process 400 for using the trained CNN configured with neighbor-based activation functions, in accordance with some example embodiments. With architecture and the parameters obtained in the training stage, the trained deep CNN can be used for classifying an image or a patch of an image.

At 410, at least one test image (or portion thereof) is received (e.g., from the sensor 205) by the CNN 210, and at 420 the test image is processed by at least one convolutional layer 105 to determine a convolutional result, and then compute the activation result by using at least the neighbor-based activation function $f(x_{co}, \Omega(x_c))$. If the CNN 210 includes a pooling layer, then the pooling layer may be applied to down sample (e.g., using max-pooling) the activation results. At 430, the output of the CNN 210 may then be used as a detection result indicative of whether the test image of 410 includes an object of interest or just background (i.e., not having an object of interest). The detection result may then be provided as a warning indicator, control signal, and/or transmitted to other devices via transceiver 215.

Figure 5:
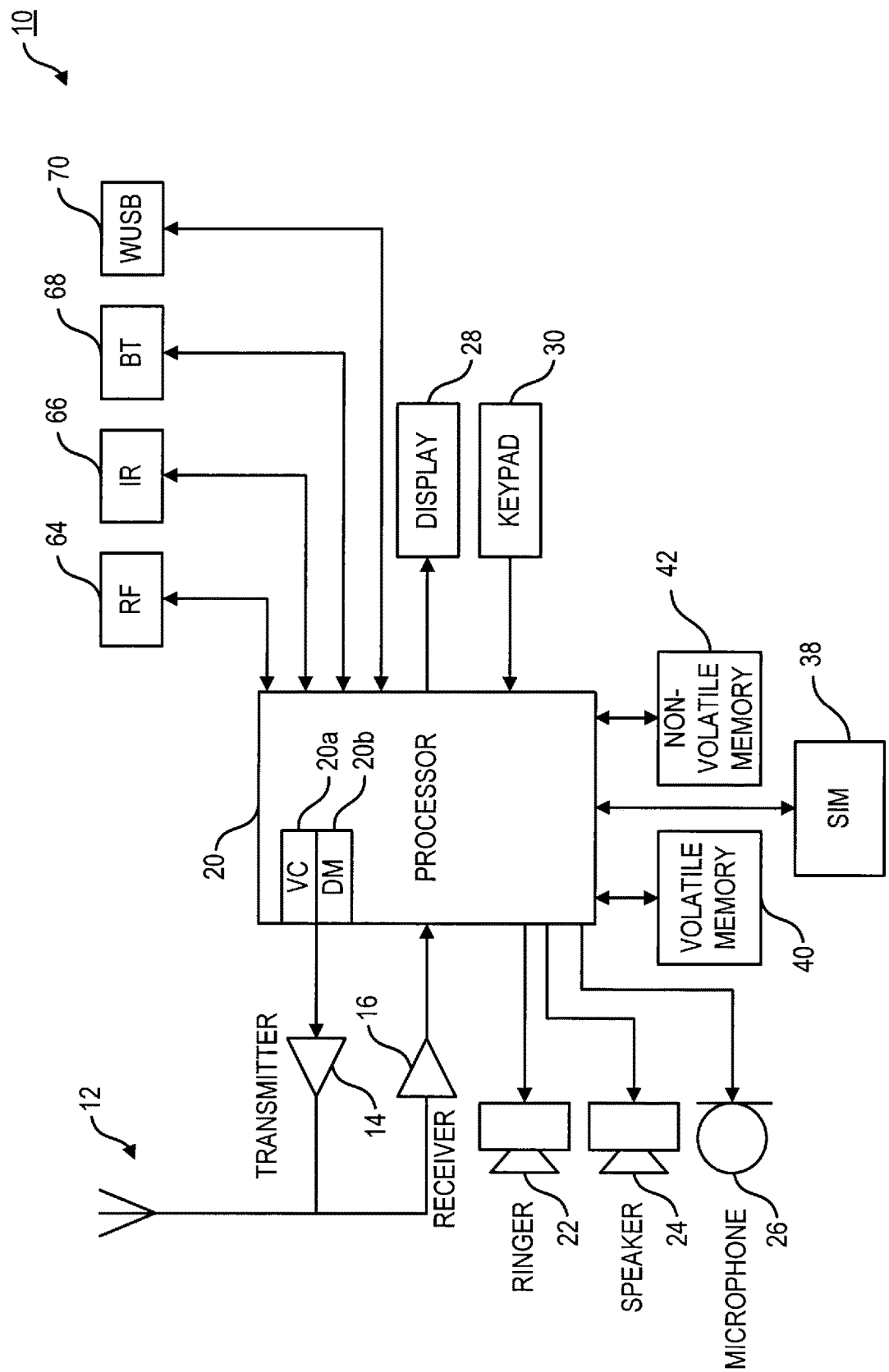
FIG. 5 depicts an example of an apparatus, in accordance with some example embodiments.

FIG. 5 illustrates a block diagram of an apparatus 10, in accordance with some example embodiments. The apparatus 10 (or portions thereof) may be configured to provide at least the radio transceiver 215 of FIG. 2 for example, although the apparatus 10 may also provide the CNN 210 and/or the sensor 205 as well. For example, the image sensor 205 and CNN 210 may be mounted in a vehicle, and the apparatus 10 may provide communications to other devices.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20$a$, an internal data modem (DM) 20$b$, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein (see, for example, processes 300 and 400.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is enhanced and more accurate image detection in computer-vision based systems.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. An apparatus comprising:
   at least one processor; and
   at least one memory including program code which when executed by the at least one processor causes the apparatus to at least:
   receive, as a first input to a machine learning model, a first portion of a training image, wherein the test image is received from an image sensor at the apparatus, and wherein the training image is used to train the machine learning model at the apparatus;
   apply, by the machine learning model, a convolutional filter to the first portion of the training image to form a first convolutional result;
   receive, as a second input to the machine learning model, a second convolutional result that was formed by applying the convolutional filter to a second portion of the training image, wherein the second portion comprises a neighboring region of the first portion of the training image; and
   apply, by the machine learning model, a neighbor-based activation function to form an output, wherein the neighbor-based activation function applies an activation function to a sum of the first convolutional result and a difference between the first convolutional result and the second convolutional result, the difference squared and normalized, wherein the object is indicative of a detected object, and
   wherein the machine learning model comprises a neural network.

2. The apparatus of claim 1, wherein the machine learning model comprises a convolutional neural network and/or a deep convolutional neural network.

3. The apparatus of claim 1, wherein the activation function is a non-linear function, wherein the non-linear function comprises at least one of a sigmoid function or a rectified linear unit (ReLu) function.

4. The apparatus of claim 1, wherein the apparatus is further caused to at least provide, by the machine learning model, the output to enable detection between the object of interest in the training image and background in the training image, and
   wherein the output is provided to a pooling layer to provide downsampling.

5. A method comprising:
   receiving, as a first input to a machine learning model, a first portion of a training image, wherein the test image is received from an image sensor at a vehicle, and wherein the training image is used to train the machine learning model at the vehicle;
   applying, by the machine learning model, a convolutional filter to the first portion of the training image to form a first convolutional result;
   receiving, as a second input to the machine learning model, a second convolutional result that was formed by applying the convolutional filter to a second portion of the training image, wherein the second portion comprises a neighboring region of the first portion of the training image; and
   apply, by the machine learning model, a neighbor-based activation function to form an output, wherein the neighbor-based activation function applies an activation function to a sum of the first convolutional result a difference between the first convolutional result and the second convolutional result, the difference squared and normalized, wherein the object is indicative of a detected object, and
   wherein the machine learning model comprises a neural network.

6. The method of claim 5, wherein the machine learning model comprises a convolutional neural network and/or a deep convolutional neural network.

7. The method of claim 5, wherein the activation function is a non-linear function, wherein the non-linear function comprises at least one of a sigmoid function or a rectified linear unit (ReLu) function.

8. The method of claim 5, wherein the first convolution result represents an inner product between the first portion of the training image and a weight vector, and wherein the second convolutional result represents an inner product between the second portion of the training image and a second weight vector.

9. The method of claim 5, wherein the apparatus is further caused to at least provide, by the machine learning model, the output as an output to enable detection between the object in the training image and background in the training image, and
   wherein the output is provided to a pooling layer to provide downsampling.

10. An apparatus comprising:
    at least one processor; and
    at least one memory including program code which when executed by the at least one processor causes the apparatus to at least:
    receive, as a first input to a trained machine learning model, a first portion of a test image, wherein the test image is received from an image sensor at the apparatus;
    apply, by the trained machine learning model, a convolutional filter to the first portion of the test image to form a first convolutional result;
    receive, as a second input to the trained machine learning model, a second convolutional result that was formed by applying the convolutional filter to a second portion of the test image, wherein the second portion comprises a neighboring region of the first portion of the test image; and
    apply, by the trained machine learning model, a neighbor-based activation function to form an output, wherein the neighbor-based activation function applies an activation function to a sum of the first convolutional result a difference between the first convolutional result and the second convolutional result, the difference squared and normalized, and provide, by the trained machine learning model, the output indicative of a detected object, and wherein the trained machine learning model comprises a neural network.

11. The apparatus of claim 10, wherein the trained machine learning model comprises a convolutional neural network and/or a deep convolutional neural network.

12. The apparatus of claim 10, wherein the neighbor-based activation function is a non-linear function, wherein the non-linear function comprises at least one of a sigmoid function or a rectified linear unit (ReLu) function.

13. The apparatus of claim 12, wherein the first convolution result represents an inner product between the first portion of the test image and a weight vector, and wherein the second convolutional result represents an inner product between the second portion of the test image and another weight vector.

14. The apparatus of claim 10, wherein the apparatus is further caused to at least provide the activated output to another layer.

15. The apparatus of claim 10, wherein the apparatus is further caused to at least provide the output to a pooling layer.

16. A method comprising receiving, as a first input to a trained machine learning model, a first portion of a test image, wherein the test image is received from an image sensor at a vehicle;

apply, by the trained machine learning model, a convolutional filter to the first portion of the test image to form a first convolutional result;

receiving, as a second input to the trained machine learning model, a second convolutional result that was formed by applying the convolutional filter to a second portion of the test image, wherein the second portion comprises a neighboring region of the first portion of the test image; and apply, by the trained machine learning model, a neighbor-based activation function to form an output, wherein the neighbor-based activation function applies an activation function to a sum of the first convolutional result a difference between the first convolutional result and the second convolutional result, the difference squared and normalized;

providing, by the trained machine learning model, the activated output indicative of a detected object, and wherein the trained machine learning model comprises a neural network.

17. The apparatus of claim 1, wherein the apparatus comprises or is comprised in a vehicle.

18. The apparatus of claim 17, wherein the apparatus comprises or is comprised in a vehicle, and wherein the output indicative of the detected object causes at least one action at the vehicle, wherein the action comprises at least one of initiate breaking, initiate acceleration, initiate deceleration, and initiate steering.

19. The apparatus of claim 17, wherein the apparatus comprises or is comprised in a vehicle, and wherein the output indicative of the detected object is transmitted, via a radio transceiver, to at least one of another vehicle, an interact of things device, a cloud platform, and a mobile edge computing platform.

\* \* \* \* \*